April 13, 1943. W. F. COLLIER 2,316,565
ROTARY PUMP SHAFT BEARING AND SEAL
Filed April 15, 1940
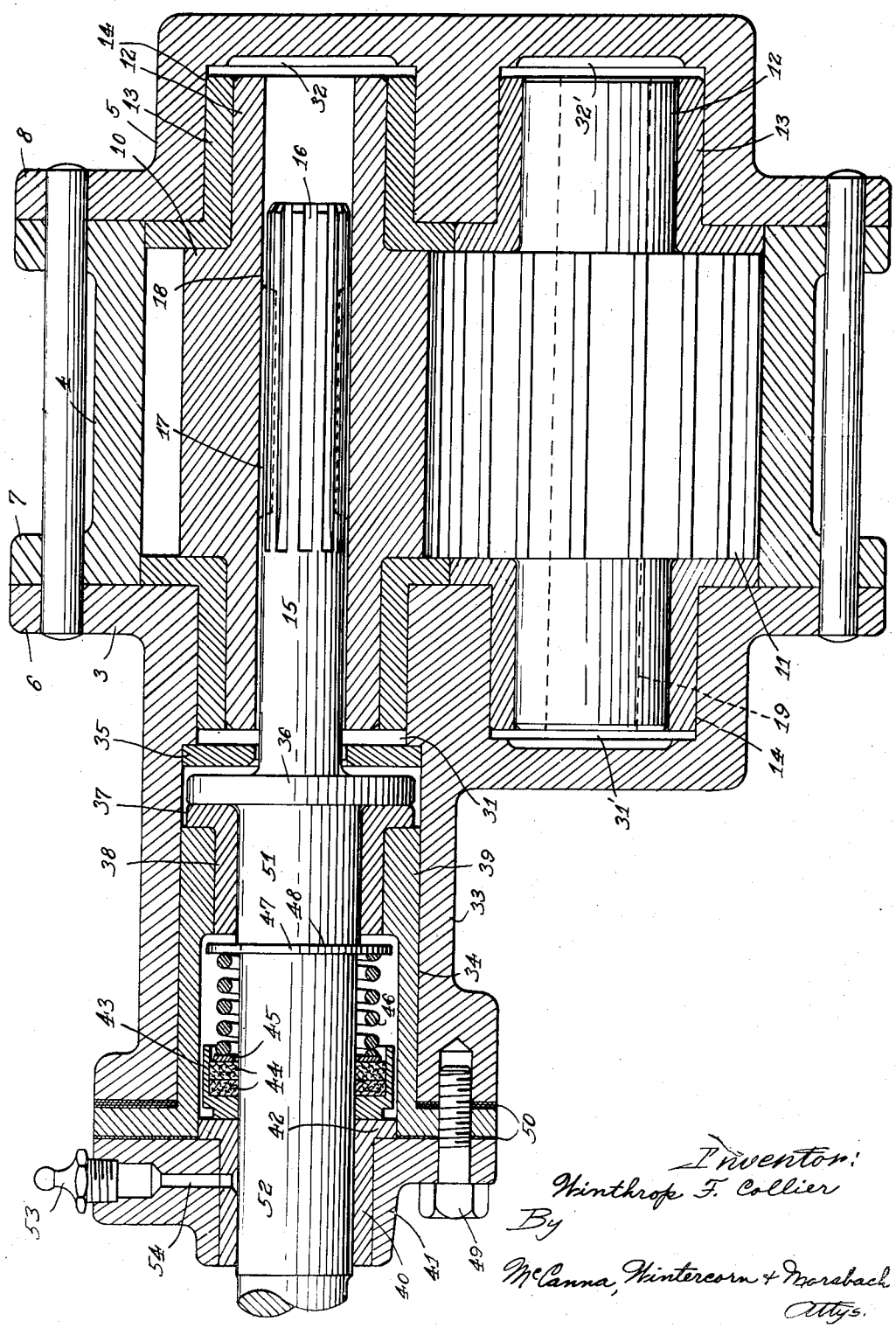
Inventor:
Winthrop F. Collier
By
McCanna, Wintercorn & Morsbach
Attys.

Patented Apr. 13, 1943

2,316,565

UNITED STATES PATENT OFFICE 2,316,565

ROTARY PUMP SHAFT BEARING AND SEAL

Winthrop F. Collier, Rockford, Ill., assignor to Geo. D. Roper Corporation, Rockford, Ill., a corporation of Illinois Application April 15, 1940, Serial No. 329,756

4 Claims. (Cl. 308—36.2)

This invention relates to improvements in rotary pump shaft bearings and seals.

The efficiency of a rotary pump is largely determined by the close spacing of parts, and a well constructed pump must, therefore, provide properly for the maintenance of the various parts in such spaced relationship. Other rotary pumps with which I am familiar have been objectionable because the end thrust on the drive shaft, due to pressure within the pump or to its drive connections outside, was transmitted directly to the associated gear and in many cases also directly to the seal members, thus sooner or later causing the pump to leak and operate inefficiently. It is therefore the principal object of my invention to provide a rotary pump in which the drive shaft has a spline connection with one of the gears and is, therefore, in floating relation to the pump body, provision being made on the one hand to assume the hydraulic thrust so that the seal members are relieved of undesirable pressure, and other provision being made to assume thrust in the opposite direction arising outside the pump, so that it cannot be transmitted to the associated gear.

Another important object of my invention consists in the provision of an annular flange on the drive shaft at a point posterior to the mechanical seal that surrounds the shaft, this portion of the shaft and the seal being in a hollow extension of the pump body, and there being provided in accordance with my invention a flanged tubular member to fit in the hollow extension to engage the flange on the shaft to assume the shaft's end thrust independently of the mechanical seal means which the tubular member surrounds, while a bearing cap is also provided for rotary support of the shaft on the hollow extension and also to provide an abutment for the mechanical seal, the bearing cap being fastened to the hollow extension through the flange of the tubular member.

The invention is illustrated in the accompanying drawing showing a central longitudinal section through a rotary pump made in accordance with the invention. The body of the pump is formed by the three cast parts, 3, 4, and 5, 3 being the face plate, 4 the intermediate housing, and 5 the back plate. These parts are flanged, as indicated at 6, 7, and 8 respectively, to receive body bolts 9 for securing the parts together. 10 is the drive gear, and 11 the driven gear meshing therewith, both having trunnion portions 12 on opposite ends, received in bearing bushings 13 entered in bearing recesses 14 provided therefor in the back and face plates. The drive gear 10 is arranged to be driven by means of a drive shaft 15, whose splined inner end portion 16 has a slip fit in the splined portion 17 of the bore 18 of the gear 10. The gear 11 also has a longitudinal axial bore, as indicated at 19. The intermediate housing 4 has a hollow neck projecting from one side thereof communicating with a suction chamber on one side of the intermeshing gears 10 and 11, and there is a similar hollow neck on the other side of the housing communicating with a discharge chamber on that side of the intermeshing gears.

The axial bore 18 in the gear 10, extending through the trunnions 12, and the axial bore 19 similarly provided in the gear 11 open communication between the chambers 31 and 32 and 31' and 32' at the outer ends of the bearing recesses 14 so that the gears are hydraulically balanced and will wear evenly at both ends and operate with least frictional drag.

The face plate 3 has a hollow extension 33 in which a counterbore 34 is provided in coaxial alignment and communication with the outer end of the bearing recesses 14 providing the chamber 31. 35 is a bronze thrust washer entered with a press fit in the inner end of the counterbore 34 and arranged to be engaged by the annular flange 36 on the drive shaft 15 when the latter tends to drift inwardly due to any thrust loads originating outside the pump, thus relieving the gear 10 of any thrust and at the same time avoiding having the seal members affected in any way. The hydraulic pressure acting against the inner end of the drive shaft 15 and against the flanged portion 36 keeps the flange 36 normally in engagement with the flange 37 of a bronze bearing bushing 38, which is carried in an elongated tubular bearing member 39 entered in the outer end of the counterbore 34, and in that way the thrust on the drive shaft is not transmitted to the seal members. A stationary bronze bushing 40 carried in the cap 41 applied to the outer end of the extension 33 has a flange 42 on the inner end thereof whose smooth flat inner face provides an abutment for the cup-shaped steel seal ring 43 turning with the shaft 15. The ring 43 contains two rings 44 of packing material and a thin steel compression ring 45, and there is a coiled compression spring 46 surrounding the shaft 15 between the ring 45 and a washer 47 held against displacement along the shaft by engagement with an annular bolt 48 thereon, the spring 46 being compressed enough to cause the packing rings 44 to prevent fluid leakage between the shaft and the rings and keep the seal ring 43 in fluid-tight running engagement with the flange 42. A plurality of bolts 49 are entered through registering holes in flanges on the tubular bearing member 39 and cap 41, and thread in holes provided therefor in the end of the extension 33 to hold the parts in assembled relation, the bolts when tightened serving to compress suitable gaskets 50 interposed between the flanges to prevent leakage. The bearings 38 and 40, it will be noticed, are elongated and receive the enlarged portions 51 and 52 of the shaft 15 to furnish adequate bearing support for the drive shaft, keeping it in perfect alignment with the sealing flange 42 so that the seal ring 43 turning with the shaft will not be given any eccentric movement. We have found that mechanical seals of the kind disclosed will not function at all properly if there is any possibility for eccentric movement between the sealing surfaces. The present construction avoids that possibility because the tubular bearing member 39 carries the bearing 38 in its one end and the flange 42 of the other bearing 40 is piloted in the other end of said bearing member. The bearing 38 will ordinarily receive sufficient lubrication from the oil or other fluid finding its way along the shaft 15 from the pumping gears so that there is no need for lubrication of this bearing from outside the pump. However, the bearing 40 is provided with a lubricator nipple 53 communicating with the bearing through the hole 54.

It is believed the foregoing description conveys a good understanding of the objects and advantages of my invention. The appended claims have been drawn to cover all legitimate modifications and adaptations.

I claim:

1. In a device of the character described, a thrust bearing and seal assembly for a rotary shaft having an outer casing, the casing having an open ended bore therein in substantially concentric relation with the shaft, and the shaft having an annular flange rigid therewith within the bore engageable with a thrust bearing surface at the inner end of the bore to limit endwise movement of the shaft inwardly, said thrust bearing and seal assembly comprising an elongated tubular bearing member fitting slidably in the bore and having a combination radial and end thrust bearing on the inner end thereof for bearing support of the shaft and end thrust engagement with the flange thereon to limit endwise movement of the shaft in an outward direction, said bearing member having an outwardly projecting annular flange on the outer end thereof for abutment with the casing at the outer end of the bore, a second bearing for said shaft on a cap having abutment with the flanged end of the aforesaid bearing member and adapted to be secured therewith to the casing, and a rotary seal ring turning with said shaft inside the aforesaid bearing member between the bearings and spring pressed toward engagement with a smooth surface provided therefor on the inner side of the second bearing.

2. In a device of the character described, a thrust bearing and seal assembly for a rotary shaft having an outer casing, the casing having an open ended bore therein in substantially concentric relation with the shaft, and the shaft having an annular flange rigid therewith within the bore for limiting endwise movement of the shaft in either direction, said thrust bearing and seal assembly comprising a thrust ring removably mounted in the inner end of said bore for engagement with the inner side of the flange to limit inward movement of said shaft, an elongated tubular bearing member fitting slidably in the bore and having a combination radial and end thrust bearing on the inner end thereof for bearing support of the shaft and end thrust engagement with the flange thereon to limit endwise movement of the shaft in an outward direction, said bearing member having an outwardly projecting annular flange on the outer end thereof for abutment with the casing at the outer end of the bore, a second bearing for said shaft on a cap having abutment with the flange end of the aforesaid bearing member and adapted to be secured therewith to the casing, and a rotary seal ring turning with said shaft inside the aforesaid bearing member between the bearings and spring pressed toward engagement with a smooth surface provided therefor on the inner side of the second bearing.

3. In a device of the character described, a thrust bearing and seal assembly for a rotary shaft having an outer casing, the casing having an open ended bore therein in substantially concentric relation with the shaft, and the shaft having an annular flange rigid therewith within the bore engageable with a thrust bearing surface at the inner end of the bore to limit endwise movement of the shaft inwardly, said thrust bearing and seal assembly comprising an elongated tubular bearing member fitting slidably in the bore and having a combination radial and end thrust bearing on the inner end thereof for bearing support of the shaft and end thrust engagement with the flange thereon to limit endwise movement of the shaft in an outward direction, the radial bearing being concentric with the end of said bearing member, and said bearing member having a close fit in the bore so as to locate the bearing in accurate concentric relation with said bore, said bearing member having an outwardly projecting annular flange on the outer end thereof for abutment with the casing at the outer end of the bore, said bearing member also having a bore therein opening from the outer end thereof in concentric relation with the aforesaid bearing, a second bearing for said shaft on a cap having abutment with the flanged end of the aforesaid bearing member and adapted to be secured therewith to the casing, said second bearing having a pilot projection in concentric relation with the bearing fitting closely in the outer end of the bore in the first named bearing member so as to locate the second bearing in accurate concentric relation with the first bearing, the pilot projection having a smooth surface provided thereon normal to the axis of said shaft, and a rotary seal ring turning with said shaft inside the aforesaid bearing member between the bearings and spring pressed toward engagement with said surface.

4. A bearing and seal structure for a rotary shaft having an outer casing, the casing having an open ended bore therein in substantially concentric relation with the shaft, and the shaft having an annular flange rigid therewith within the bore engageable with a thrust bearing surface at the inner end of the bore to limit endwise movement of the shaft inwardly, an elongated tubular bearing member fitting slidably in the bore and having a combination radial and end thrust bearing on the inner end thereof for bearing support of the shaft adjacent the annular flange and end thrust engagement with the flange to limit endwise movement of the shaft outwardly, said shaft being of reduced diameter from a point in outwardly spaced relation to the last named bearing whereby to provide an annular shoulder thereon spaced from the bearing, a rotary seal ring on the reduced portion of said shaft inside the aforesaid bearing member, spring means surrounding the shaft and abutting said annular shoulder and urging the rotary seal ring outwardly away from the aforesaid bearing, said bearing member having an outwardly projecting annular shoulder on the outer end thereof for abutment with the casing at the outer end of the bore, and a second bearing for said shaft on a cap having abutment with the flanged end of the bearing member and secured therewith to the casing, said second bearing having a smooth surface provided on the inner side thereof for sliding engagement with the rotary seal ring.

WINTHROP F. COLLIER.